(12) United States Patent
Miller (10) Patent No.: US 11,549,384 B2
(45) Date of Patent: Jan. 10, 2023

(54) FACE SEAL ARRANGEMENT

(71) Applicant: Raytheon Technologies Corporation, Farmington, CT (US)

(72) Inventor: Jonathan Logan Miller, Belchertown, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 308 days.

(21) Appl. No.: 16/877,636

(22) Filed: May 19, 2020

(65) Prior Publication Data

US 2021/0363893 A1 Nov. 25, 2021

(51) Int. Cl.
*F01D 11/00* (2006.01)
*F16J 15/34* (2006.01)

(52) U.S. Cl.
CPC .......... *F01D 11/00* (2013.01); *F16J 15/3452* (2013.01)

(58) Field of Classification Search
CPC .............................. F01D 11/00; F16J 15/3452
See application file for complete search history.

(56) References Cited

U.S. PATENT DOCUMENTS

| | | | |
|---|---|---|---|
| 6,196,790 B1 | 3/2001 | Sheridan et al. | |
| 10,024,241 B2 * | 7/2018 | Miller | F02C 7/06 |
| 10,563,530 B2 | 2/2020 | Wotzak | |
| 2005/0248093 A1 * | 11/2005 | Keba | F16J 15/004 |
| | | | 277/358 |
| 2018/0195415 A1 | 7/2018 | Witlicki | |

FOREIGN PATENT DOCUMENTS

| | | |
|---|---|---|
| EP | 1243755 A1 | 9/2002 |
| EP | 3434868 A1 | 1/2019 |
| EP | 3447251 A1 | 2/2019 |
| WO | 2014150187 A1 | 9/2014 |

OTHER PUBLICATIONS

European Search Report for European Application No. 21172551.0, dated Oct. 22, 2021, 8 pages.

* cited by examiner

*Primary Examiner* — Sabbir Hasan
(74) *Attorney, Agent, or Firm* — Cantor Colburn LLP (57) ABSTRACT

A seal assembly includes an annular seal support, and an annular seal housing operably connected to the seal support. The seal housing includes a first axial surface facing away from the seal support, and a second axial surface opposite the first axial surface. A seal is located at the first axial surface. One or more first springs extend between the seal support and the second axial surface to urge the seal housing away from the seal support, and one or more second springs are located at the first axial surface to urge the seal housing toward the seal support.

18 Claims, 7 Drawing Sheets

FACE SEAL ARRANGEMENT

BACKGROUND

Exemplary embodiments of the present disclosure pertain to the art of gas turbine engines, and in particular to face seal arrangements of gas turbine engines.

A face seal is typically utilized to seal between a relatively high pressure area and a relatively low pressure area of a gas turbine engine. The seal includes a seal support, which in some configurations is an annular ring. An annular seal housing is installed to the seal support, and includes a seal ring that extends axially to and contacts a seal seat to define a seal interface. The seal housing is supported by a plurality of retention pins arrayed around the seal support. The seal ring is biased toward the seal seat in an axial direction by one or more springs extending from the seal support to a spring guide located at the seal housing.

Seal failure is typically observed as premature sealing face wear which starts to translate the seal assembly and lengthen the spring. As this wear progresses and spring lengthening continues, the spring load is reduced to a level however that level can still be high enough which continued wear and more severe damage to the seal can occur. This additional seal damage can lead to increased level of engine system risk and additional damage to surrounding hardware. The challenge was to create a design that could mitigate this issue and still meet all other design requirements and critical features.

BRIEF DESCRIPTION

In one embodiment, a seal assembly includes an annular seal support, and an annular seal housing operably connected to the seal support. The seal housing includes a first axial surface facing away from the seal support, and a second axial surface opposite the first axial surface. A seal is located at the first axial surface. One or more first springs extend between the seal support and the second axial surface to urge the seal housing away from the seal support, and one or more second springs are located at the first axial surface to urge the seal housing toward the seal support.

Additionally or alternatively, in this or other embodiments one or more retention pins extend from the seal support through the seal housing, the one or more second springs extending along the one or more retention pins.

Additionally or alternatively, in this or other embodiments the one or more retention pins includes an axial retention feature such that the seal housing is disposed axially between the axial retention feature and the seal support, and the one or more second springs extend between the axial retention feature and the first axial surface.

Additionally or alternatively, in this or other embodiments the one or more retention pins each extend through a slotted opening in the seal housing.

Additionally or alternatively, in this or other embodiments the one or more second springs are circumferentially offset from the one or more first springs.

Additionally or alternatively, in this or other embodiments the seal and a seal seat define a seal interface therebetween.

Additionally or alternatively, in this or other embodiments the second springs are configured to reduce a net axial force of the seal on the seal seat.

Additionally or alternatively, in this or other embodiments the one or more second springs are helical springs.

Additionally or alternatively, in this or other embodiments the one or more second springs are one to sixteen second springs.

Additionally or alternatively, in this or other embodiments the one or more second springs are equally circumferentially spaced about the seal housing.

In another embodiment, a gas turbine engine includes a combustor, a turbine driven by products of the combustor, a compressor operably connected to the turbine and driven by rotation of the turbine, and a seal assembly to seal between a two areas of the gas turbine engine. The seal assembly includes an annular seal support, and an annular seal housing operably connected to the seal support. The seal housing includes a first axial surface facing away from the seal support and a second axial surface opposite the first axial surface. A seal is located at the first axial surface. One or more first springs extend between the seal support and the second axial surface to urge the seal housing away from the seal support, and one or more second springs are located at the first axial surface to urge the seal housing toward the seal support.

Additionally or alternatively, in this or other embodiments one or more retention pins extend from the seal support through the seal housing, and the one or more second springs extend along the one or more retention pins.

Additionally or alternatively, in this or other embodiments the one or more retention pins includes an axial retention feature such that the seal housing is disposed axially between the axial retention feature and the seal support, and the one or more second springs extend between the axial retention feature and the first axial surface.

Additionally or alternatively, in this or other embodiments the one or more retention pins each extend through a slotted opening in the seal housing.

Additionally or alternatively, in this or other embodiments the one or more second springs are circumferentially offset from the one or more first springs.

Additionally or alternatively, in this or other embodiments the seal and a seal seat define a seal interface therebetween.

Additionally or alternatively, in this or other embodiments the second springs are configured to reduce a net axial force of the seal on the seal seat.

Additionally or alternatively, in this or other embodiments the one or more second springs are helical springs.

Additionally or alternatively, in this or other embodiments the one or more second springs are one to sixteen second springs.

Additionally or alternatively, in this or other embodiments the one or more second springs are equally circumferentially spaced about the seal housing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
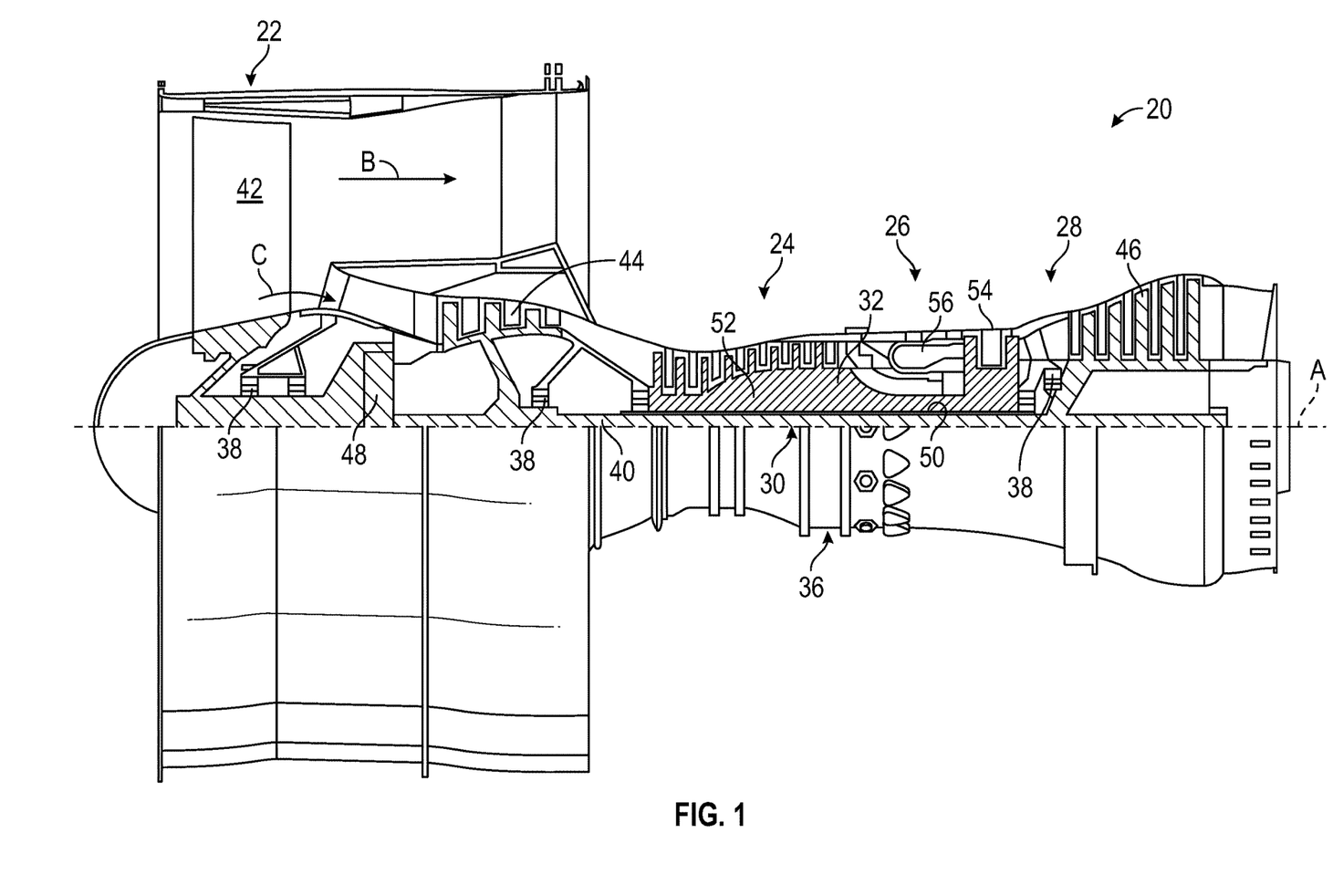
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
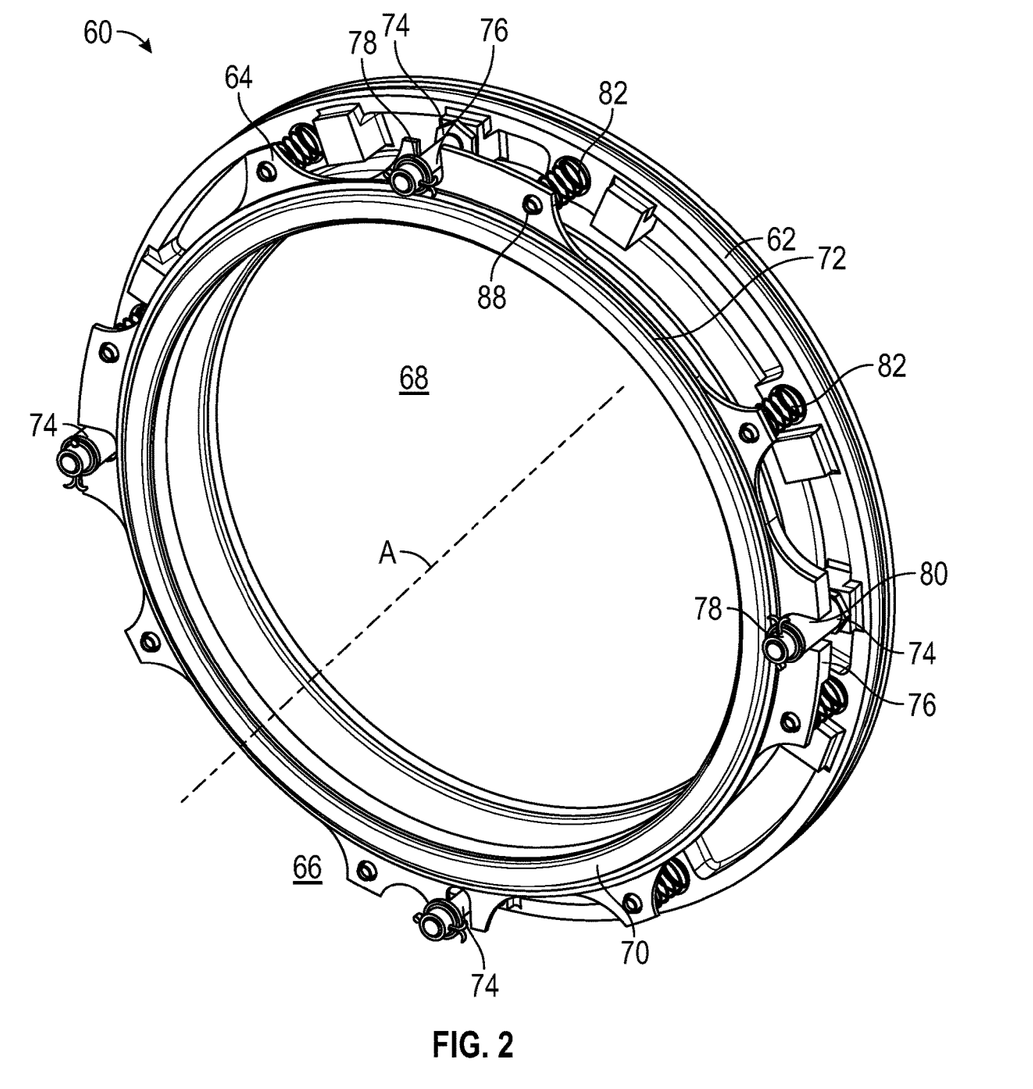
FIG. 2 is a perspective view of an embodiment of a seal assembly.

Referring to FIG. 2, illustrated is an embodiment of a face seal assembly 60. The face seal assembly 60 includes a seal support 62, which is an annular ring. A seal housing 64 extends axially from the seal support 62 and is defined as an annular ring. The seal housing 64 extends from the seal support 62 axially toward a region of relatively low pressure 66 and away from a region of relatively high pressure 68, and may be utilized to seal between the regions of relatively high pressure and relatively low pressure around a shaft 110 (best shown in FIG. 5). A seal ring 70 extends axially from a first axial surface 72 of the seal housing 64 toward the region of relatively low pressure 66. The seal assembly 60 axially separates the region of relatively low pressure 66 from the region of relatively high pressure 68, with high pressure region 68 radially inboard of the seal ring 70 and low pressure region 66 radially outboard of the seal ring 70. A plurality of pins 74 are arrayed about the seal support 62 and extend from the seal support 62 and through corresponding slotted openings 76 in the seal housing 64. The pins 74 include axial retention features 78, such as collars, caps, pins, washers and/or nuts to axially limit movement of the seal housing 64 away from the seal support 62. One or more of the pins 74 includes an anti-rotation sleeve 80 extending through the slotted opening 76, resulting in a small clearance between the anti-rotation sleeve 80 and the slotted opening 76. The small clearance with then engage on a single side of the slotted opening 76 to prevent circumferential travel of the seal housing 64 relative to the seal support 62. While four pins 74 are utilized in the embodiment of FIG. 2, other quantities of pins 74 such as three, five, six or more pins 74 may be utilized in other embodiments. Further, while in the embodiment of FIG. 2 two pins 74 have an anti-rotation sleeve 80 such a configuration is merely exemplary. In other embodiments, other number of pins 74 such as one, three or four pins 74 may include an anti-rotation sleeve 80.

Figure 3:
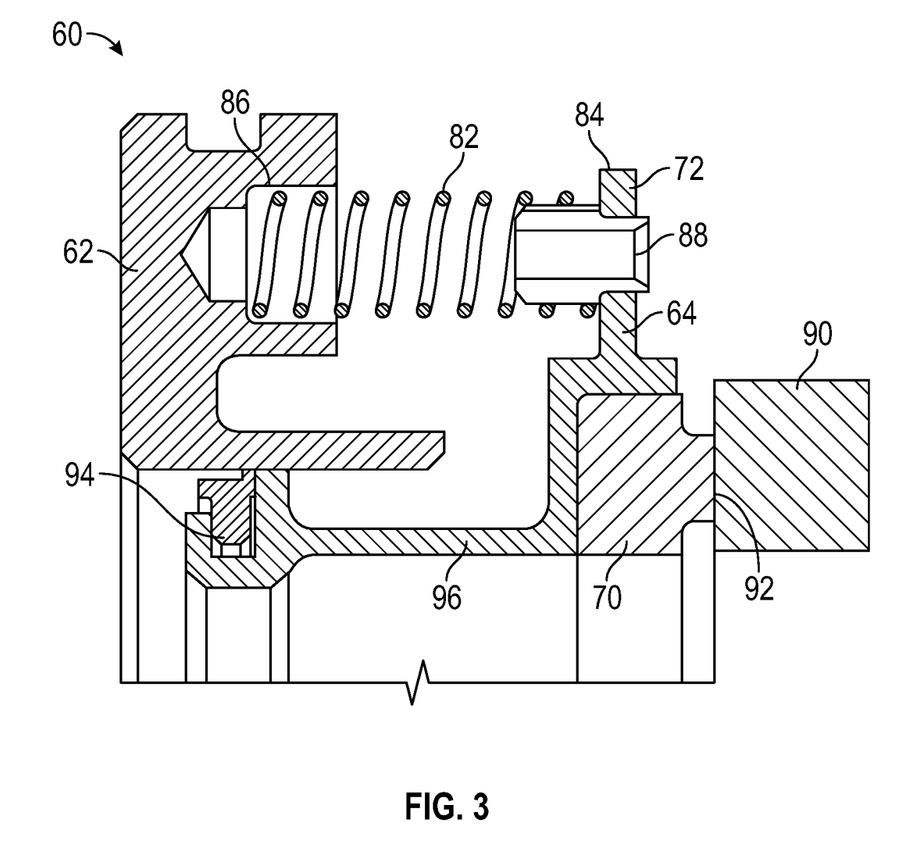
FIG. 3 is a partial cross-sectional view of an embodiment of a seal assembly.

Referring to the cross-sectional view of FIG. 3, the face seal assembly 60 further includes a plurality of first springs 82 extending between the seal support 62 and a second axial surface 84 of the seal housing 64, opposite the first axial surface 72. The first springs 82 bias the seal housing 64 away from the seal support 62. The first springs 82 are helical springs located in the seal support 62 at, for example, at corresponding spring pockets 86. Further, the seal housing 64 includes a plurality of spring guides 88 extending axially from the seal housing 64 toward the seal support 62. Each of the first springs 82 extends toward the seal housing 64 to a corresponding spring guide 88 of the plurality of spring guides 88.

The seal ring 70, which in some embodiments is formed from a carbon material extends axially from the seal housing 64 to contact a seal seat 90 defining a seal interface 92 between the seal seat 90 and the seal ring 70. In some embodiments the seal assembly 60 includes a secondary seal 94 extending between a leg 96 of the seal housing 64 and an inner radial surface 98 of the seal support 62.

Figure 4:
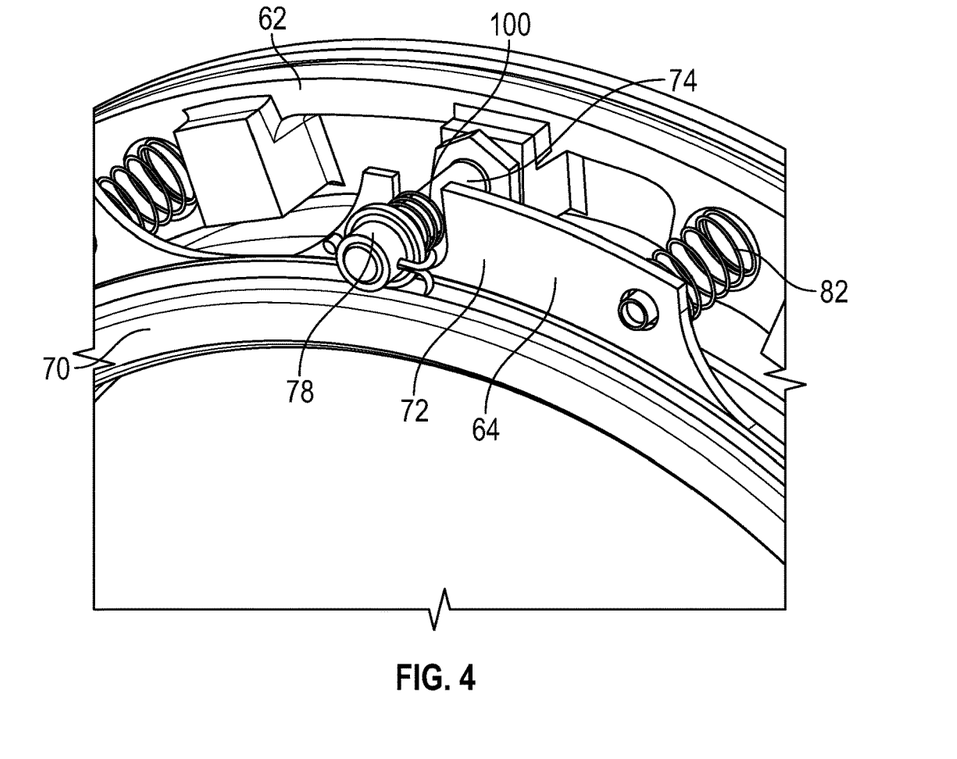
FIG. 4 is a partial perspective view of an embodiment of a seal assembly.
Figure 5:
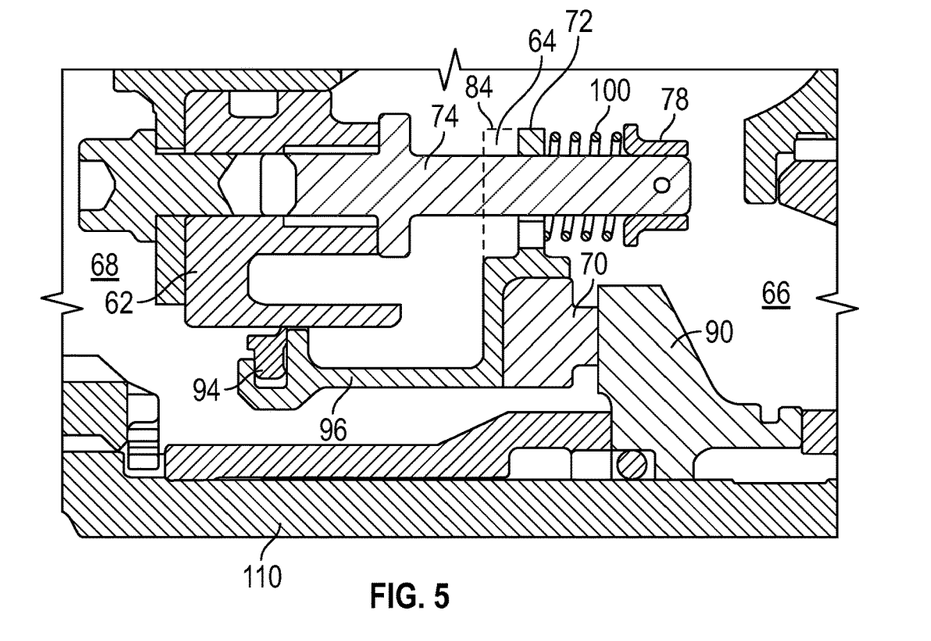
FIG. 5 is a partial cross-sectional view of an embodiment of a seal assembly.

Referring again to FIG. 2 and to FIGS. 4 and 5, the seal assembly 60 further includes a plurality of second springs 100. Each second spring 100 is located at a pin 74 of the plurality of pins 74. In some embodiments, the second springs 100 are located at pins 74 absent the anti-rotation sleeve 80. Further, in some embodiments, as shown, the second springs 100 are circumferentially offset from the first springs 82. In some embodiments, the number of second springs 100 is in the range of 1-16 second springs 100, which may be equally circumferentially spaced around the seal housing 64. The second springs 100 are helical springs, and each second spring 100 extends from the first axial surface 72 of the seal housing 64 to the axial retention feature 78 of the respective pin 74. The second springs 100 bias the seal housing 64 toward the seal support 62 and thus results, in some embodiments, in the same axial net force of the seal ring 70 on the seal seat 90 in the new/non-worn condition as compared to the typical prior art configuration.

Figure 6:
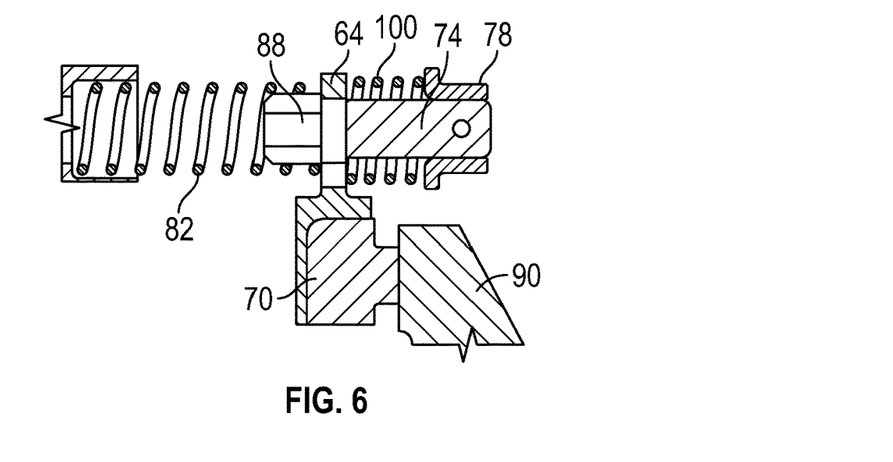
FIG. 6 is a partial cross-sectional view illustrating operation of a seal assembly.
Figure 7:
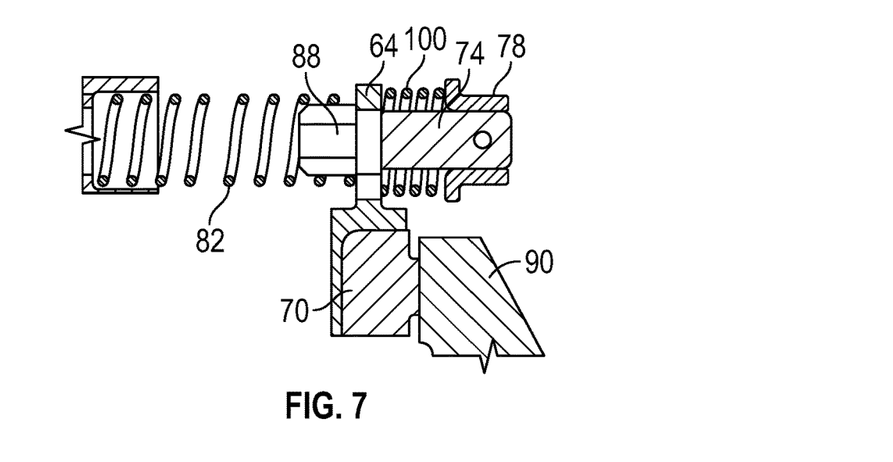
FIG. 7 is another partial cross-sectional view illustrating operation of a seal assembly.
Figure 8:
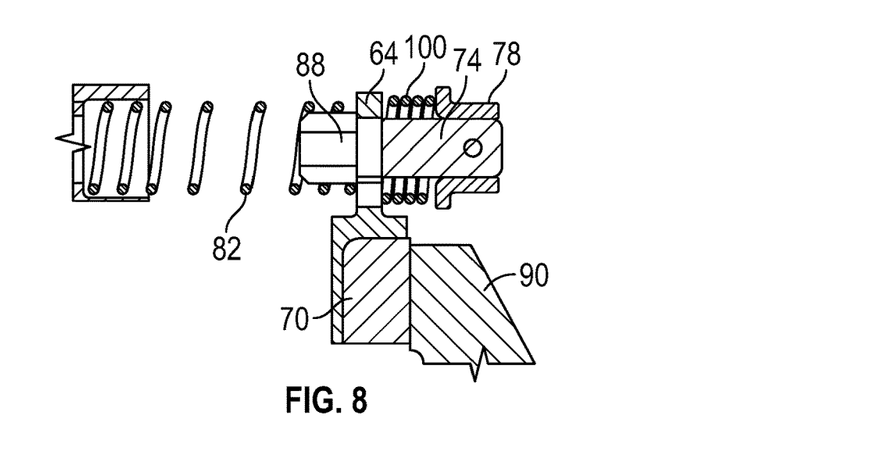
FIG. 8 is yet another partial cross-sectional view illustrating operation of a seal assembly.

Referring to FIGS. 6-8, shown is a progression over time as the seal ring 70 undergoes positive axial translation along the central longitudinal axis A, such as when the seal ring 70 wears. With a new seal ring 70, as in FIG. 6, the second spring 100 counteracts the first spring 82 to set a selected net axial force of the seal ring 70 on the seal seat 90, as an optimum net axial force for a particular application, which in some embodiments may be the same as a net axial force of a typical prior art configuration. In FIG. 7, as the seal ring 70 translates positively axially, the first spring 82 axially extends while the second spring 100 compresses. When the seal ring 70 is at a further positive translation or full positive translation state as shown in FIG. 8, the first spring 82 extends further still, while the second spring 100 compresses. In utilizing the second springs 100 in combination with the first springs 82, the net axial force of the seal ring 70 on the seal seat 90 is reduced over the course of positive axial translation of the seal ring 70, when the first spring 82 is extended or relaxed. This reduces a rate of wear of the seal ring 70, and results in a reduction in rates of seal failure and replacement. This improves durability of the seal assembly 60 and the gas turbine engine 20, reducing maintenance and repair costs.

Figure 9:
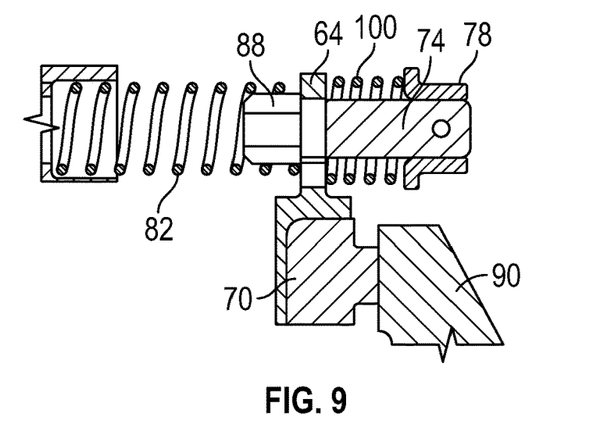
FIG. 9 is a partial cross-sectional view illustrating operation of a seal assembly under first spring compression.
Figure 10:
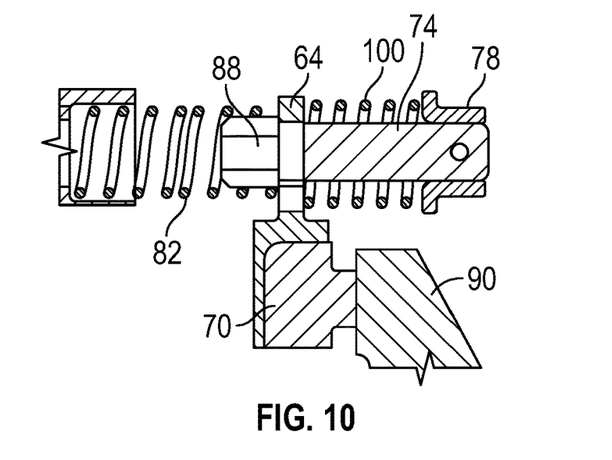
FIG. 10 is another partial cross-sectional view illustrating operation of a seal assembly under first spring compression.
Figure 11:
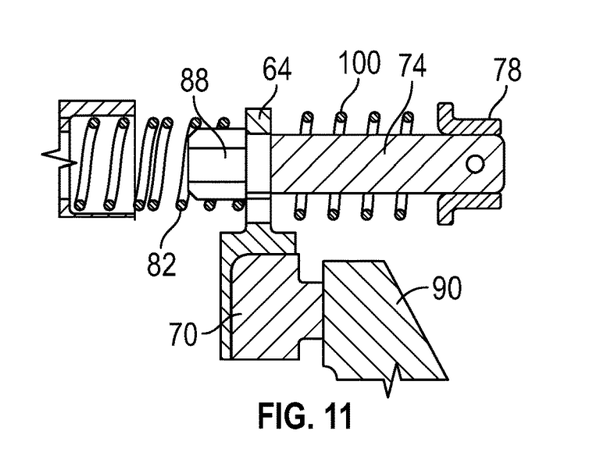
FIG. 11 is yet another partial cross-sectional view illustrating operation of a seal assembly under first spring compression.

Referring to FIGS. 9-11, under some operating conditions, seal ring 70 negatively axially translates, such that the first spring 82 is compressed over time, from a new or unworn state of the seal ring 70 illustrated in FIG. 9 to one shown in FIG. 10 and then FIG. 11. Under such conditions, the second spring 100 relaxes or extends, and the first spring 82 compresses, which will increase the net axial force of the seal ring 70 on the seal seat 90, however at a reduced total net axial force compared to a typical prior art configuration, absent the second spring. When the first spring 82 is compressed during such negative axial translation of the seal ring 70, addition of the second spring 100 aids in reducing next axial forces, reduces stresses on the first springs 82 and relieves constraints in in spring 82 geometry and design.

Figure 12:
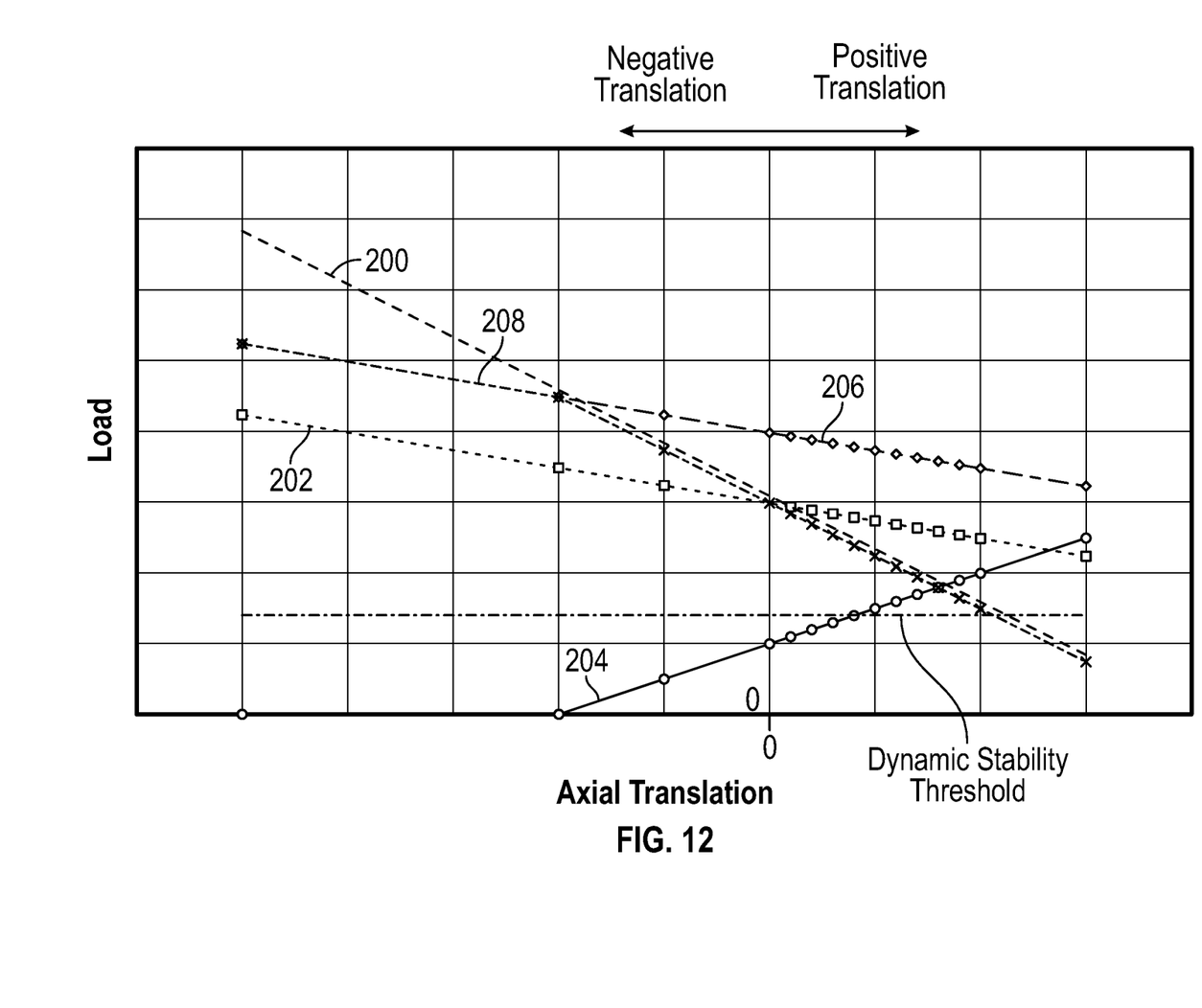
FIG. 12 is a graphical representation comparing embodiments of the present disclosure to typical prior art configurations.

Illustrated in FIG. 12 is a graphical representation comparing embodiments of the present disclosure to typical prior art configurations, which lack the second spring. The graph plots load versus axial translation of the seal ring 70. Represented at 200 is a plot of load versus axial translation of the seal ring 70 when a relatively high spring rate first spring of a prior art configuration is used. As shown, high loads are experienced as the negative axial translation of the seal ring increases. When a relatively low spring rate first spring is utilized, as shown at 202, the load remains high during positive axial translation of the seal ring. When second spring 100 is utilized, however, as illustrated at 204, in combination with first spring 82 illustrated at 206, the net load illustrated at 208 is lowered under negative axial translation of the seal ring 70 and compression of first spring 82. Similarly, during positive axial translation of the seal ring 70, when the first spring 82 is extended and second spring 100 is compressed, the net load 208 is reduced relative to the low rate spring 202.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A seal assembly comprising:
an annular seal support;
an annular seal housing operably connected to the seal support, the seal housing including:
 a first axial surface facing away from the seal support; and
 a second axial surface opposite the first axial surface;
a seal disposed at the first axial surface;
one or more first springs extending between the seal support and the second axial surface to urge the seal housing away from the seal support;
one or more second springs disposed at the first axial surface to urge the seal housing toward the seal support; and
one or more retention pins extending from the seal support through the seal housing, the one or more second springs extending along the one or more retention pins.

2. The seal assembly of claim 1, wherein the one or more retention pins includes an axial retention feature such that the seal housing is disposed axially between the axial retention feature and the seal support, the one or more second springs extending between the axial retention feature and the first axial surface.

3. The seal assembly of claim 1, wherein the one or more retention pins each extend through a slotted opening in the seal housing.

4. The seal assembly of claim 1, wherein the seal and a seal seat define a seal interface therebetween.

5. The seal assembly of claim 4, wherein the one or more second springs are configured to reduce a net axial force of the seal on the seal seat.

6. The seal assembly of claim 1, wherein the one or more second springs are helical springs.

7. The seal assembly of claim 1, wherein the one or more second springs are one to sixteen second springs.

8. The seal assembly of claim 1, wherein the one or more second springs are two or more second springs equally circumferentially spaced about the seal housing.

9. A seal assembly comprising:
an annular seal support;
an annular seal housing operably connected to the seal support, the seal housing including:
 a first axial surface facing away from the seal support; and
 a second axial surface opposite the first axial surface;
a seal disposed at the first axial surface;
one or more first springs extending between the seal support and the second axial surface to urge the seal housing away from the seal support; and
one or more second springs disposed at the first axial surface to urge the seal housing toward the seal support;
wherein the one or more second springs are circumferentially offset from the one or more first springs.

10. A gas turbine engine, comprising:
a combustor;
a turbine driven by products of the combustor;
a compressor operably connected to the turbine and driven by rotation of the turbine; and
a seal assembly to seal between two areas of the gas turbine engine, the seal assembly including:
 an annular seal support;
 an annular seal housing operably connected to the seal support, the seal housing including:
  a first axial surface facing away from the seal support; and
  a second axial surface opposite the first axial surface;
 a seal disposed at the first axial surface;
 one or more first springs extending between the seal support and the second axial surface to urge the seal housing away from the seal support;
 one or more second springs disposed at the first axial surface to urge the seal housing toward the seal support; and
 one or more retention pins extending from the seal support through the seal housing, the one or more second springs extending along the one or more retention pins.

11. The gas turbine engine of claim 10, wherein the one or more retention pins includes an axial retention feature such that the seal housing is disposed axially between the axial retention feature and the seal support, the one or more second springs extending between the axial retention feature and the first axial surface.

12. The gas turbine engine of claim 10, wherein the one or more retention pins each extend through a slotted opening in the seal housing.

13. The gas turbine engine of claim 10, wherein the one or more second springs are circumferentially offset from the one or more first springs.

14. The gas turbine engine of claim 10, wherein the seal and a seal seat define a seal interface therebetween.

15. The gas turbine engine of claim 14, wherein the one or more second springs are configured to reduce a net axial force of the seal on the seal seat.

16. The gas turbine engine of claim 10, wherein the one or more second springs are helical springs.

17. The gas turbine engine of claim 10, wherein the one or more second springs are one to sixteen second springs.

18. The gas turbine engine of claim 10, wherein the one or more second springs are two or more second springs equally circumferentially spaced about the seal housing.

* * * * *